United States Patent [19]

Horsch

[11] Patent Number: 4,858,495

[45] Date of Patent: Aug. 22, 1989

[54] MULTI-SPEED POWERSHIFT TRANSMISSION

[75] Inventor: Joachim Horsch, Lombard, Ill.

[73] Assignee: J. I. Case Company, Racine, Wis.

[21] Appl. No.: 204,167

[22] Filed: Jun. 8, 1988

[51] Int. Cl.$^4$ ............................................. F16H 3/02
[52] U.S. Cl. ...................................... 74/745; 74/360; 74/359
[58] Field of Search ................. 74/745, 360, 359, 358, 74/333

[56] References Cited

U.S. PATENT DOCUMENTS

| | | | |
|---|---|---|---|
| 2,355,623 | 8/1944 | Bullard | 74/745 |
| 3,897,699 | 8/1975 | Hoyer | 74/745 |
| 3,916,711 | 1/1975 | Hoyer | 74/745 X |
| 4,116,090 | 9/1978 | Zenker | 74/745 |
| 4,498,356 | 2/1985 | Vater et al. | 74/745 |
| 4,580,459 | 4/1986 | Zenker et al. | 74/360 X |
| 4,615,240 | 10/1986 | Weiss | 74/359 X |
| 4,637,269 | 1/1987 | Hasegawa et al. | 74/745 |

FOREIGN PATENT DOCUMENTS

| | | | |
|---|---|---|---|
| 0201901 | 8/1955 | Australia | 74/333 |
| 2049171 | 4/1972 | Fed. Rep. of Germany | 74/745 |
| 2050617 | 9/1978 | Fed. Rep. of Germany | 74/333 |
| 1164088 | 6/1985 | U.S.S.R. | 74/745 |

*Primary Examiner*—Dwight G. Diehl
*Assistant Examiner*—William Gehris

*Attorney, Agent, or Firm*—Dressler, Goldsmith, Shore, Sutker & Milnamow

[57] ABSTRACT

A multi-speed powershaft transmission comprising a speed transmission assembly, a range transmission assembly, and a master clutch for selectively connecting the speed and range transmission assemblies. The speed transmission assembly includes a speed input section which is connectable to a driven powershaft and a speed output section which is connected to the master clutch. A cluster gear assembly interconnects the speed input and output sections. The speed input section includes two hydraulically operated clutch assemblies capable of producing two different forward input speed ratios. The speed output section comprises a plurality of clutch operated driven gear assemblies and is capable of producing at least three equally different forward output speed ratios and one reverse output speed ratio. Any of the plurality of driven gear assemblies included in the speed output section are engaged by powershifting through the pair of hydraulically operated clutch assemblies included in the speed input section. The range transmission assembly includes a range input shaft, a transmission output shaft, and a plurality of hydraulically operated clutch actuated gears interposed therebetween for providing at least three different forward speed ranges. A creeper gear arrangement may be further included with the speed transmission assembly. The creeper gear arrangement is capable of producing a third forward input speed ratio.

14 Claims, 10 Drawing Sheets

FIG-2

| GEAR | TRANSMISSION CLUTCHES ENGAGED ||||||||||| 
|---|---|---|---|---|---|---|---|---|---|---|---|
| | 40 | 44 | 74 | 78 | 82 | 86 | 98 | MC | 114 | 118 | 122 |
| C1 | | | | X | | | X | X | | | X |
| C2 | | | | | X | | X | X | | | X |
| C3 | | | | | | X | X | X | | | X |
| C4 | | | | X | | | X | X | X | | |
| C5 | | | | | X | | X | X | X | | |
| C6 | | | | | | X | X | X | X | | |
| 1 | X | | | X | | | | X | | | X |
| 2 | | X | | X | | | | X | | | X |
| 3 | X | | | | X | | | X | | | X |
| 4 | | X | | | X | | | X | | | X |
| 5 | X | | | | | X | | X | | | X |
| 6 | | X | | | | X | | X | | | X |
| 7 | X | | | X | | | | X | X | | |
| 8 | | X | | X | | | | X | X | | |
| 9 | X | | | | X | | | X | X | | |
| 10 | | X | | | X | | | X | X | | |
| 11 | X | | | | | X | | X | X | | |
| 12 | | X | | | | X | | X | X | | |
| 13 | X | | | X | | | | X | | X | |
| 14 | | X | | X | | | | X | | X | |
| 15 | X | | | | X | | | X | | X | |
| 16 | | X | | | X | | | X | | X | |
| 17 | X | | | | | X | | X | | X | |
| 18 | | X | | | | X | | X | | X | |
| R1 | X | | X | | | | | X | | | X |
| R2 | | X | X | | | | | X | | | X |
| R3 | X | | X | | | | | X | X | | |
| R4 | | X | X | | | | | X | X | | |
| CR1 | | | X | | | | X | X | | | X |
| CR2 | | | X | | | | X | X | X | | |

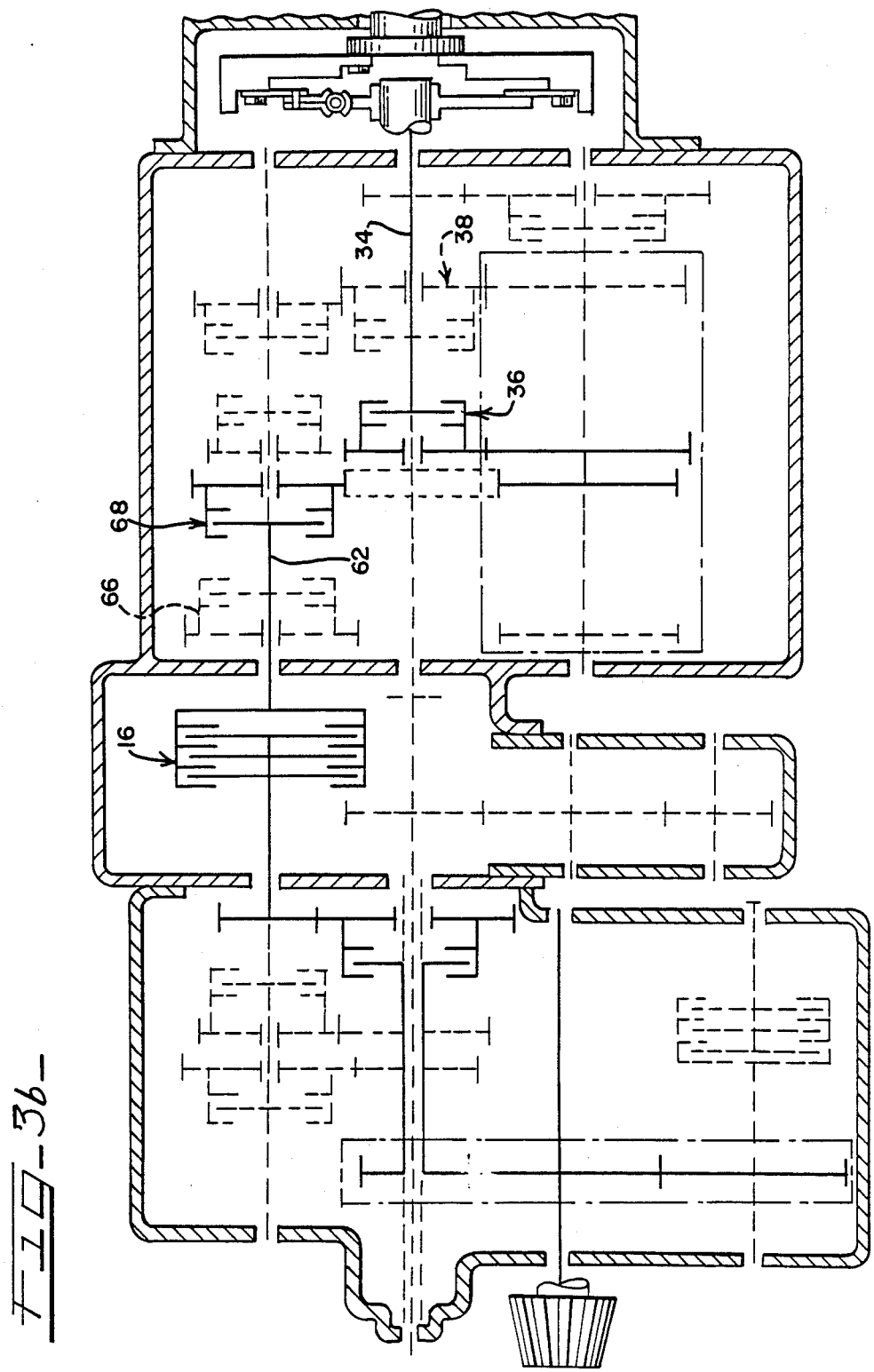

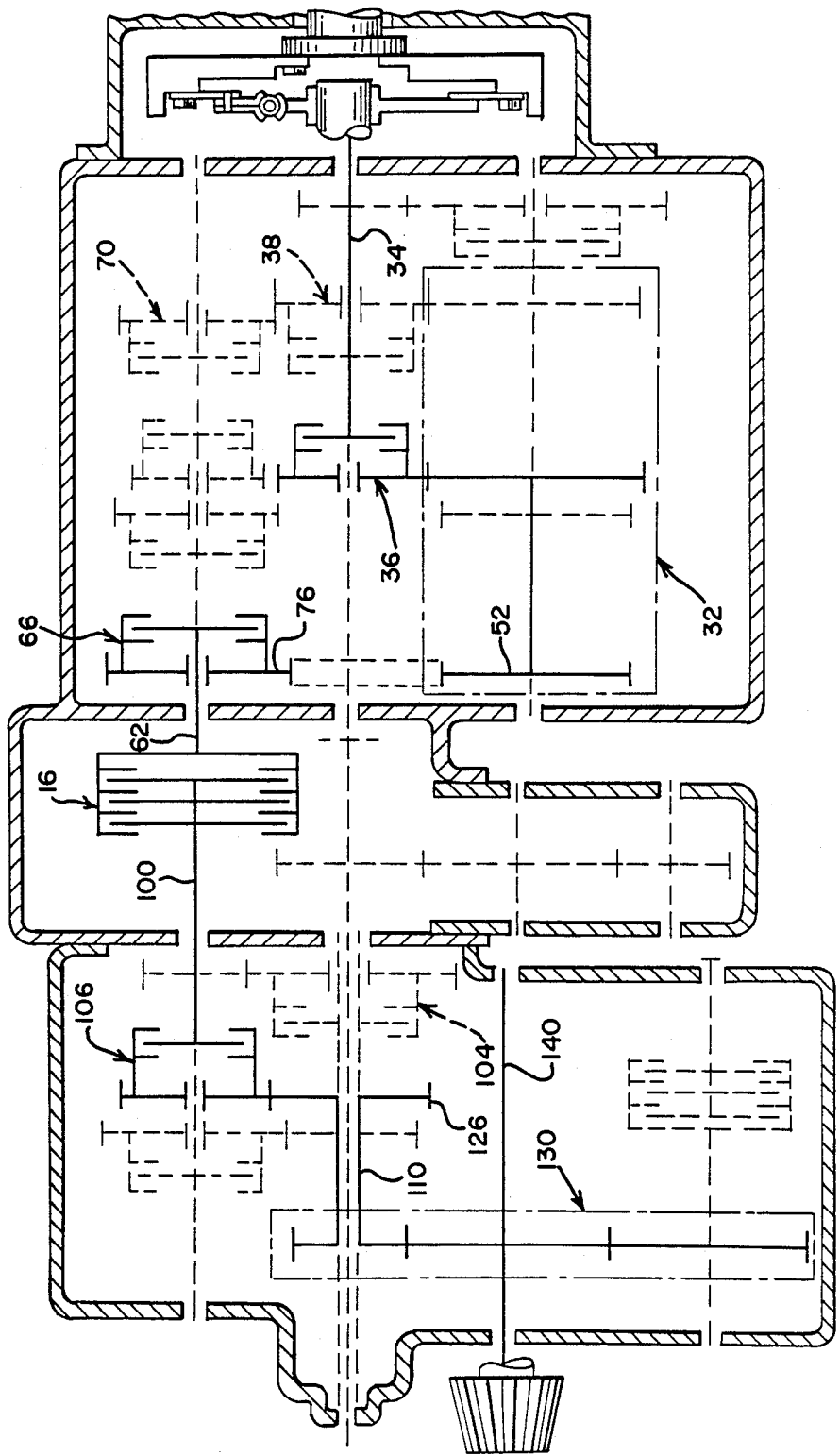

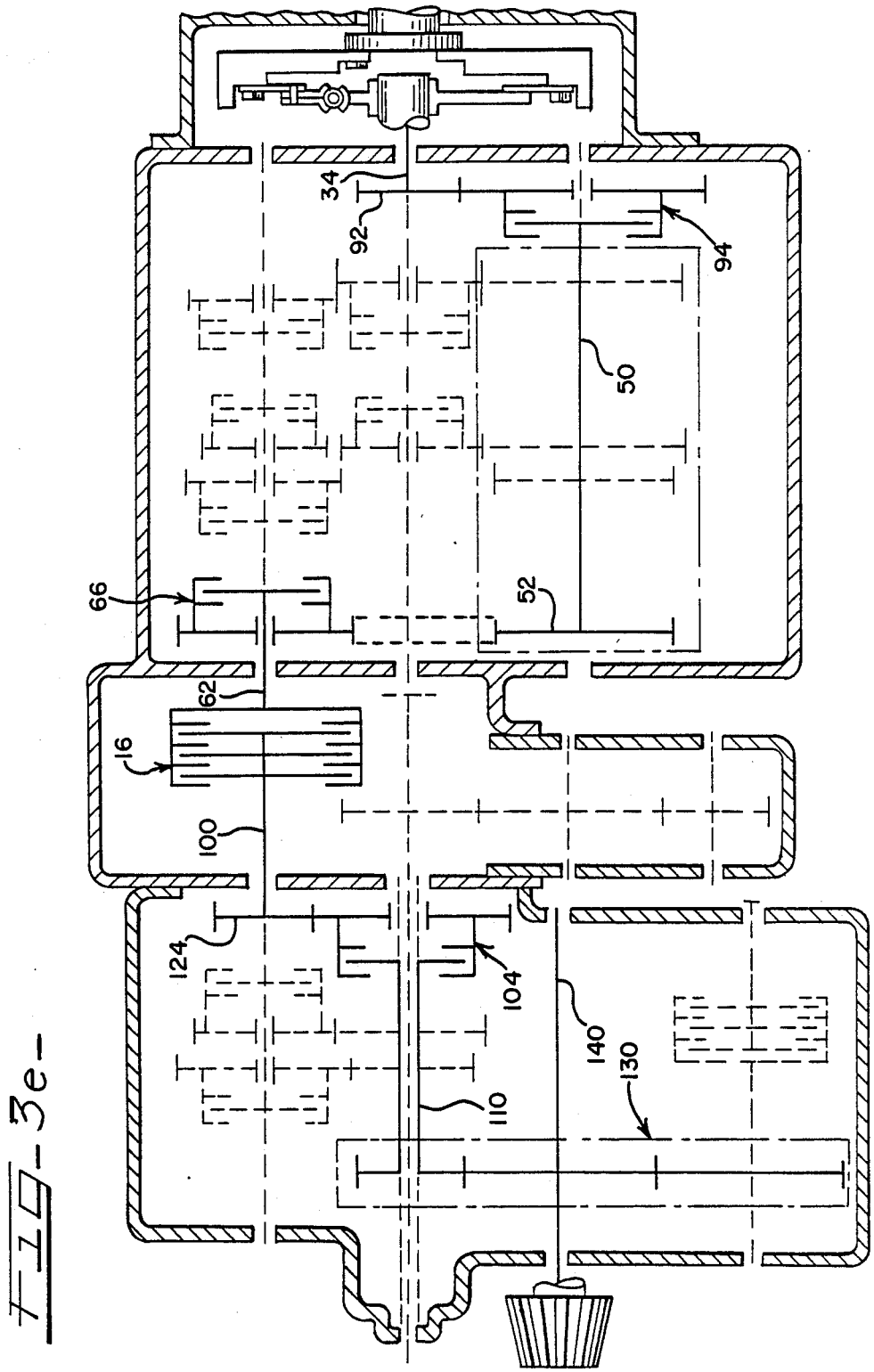

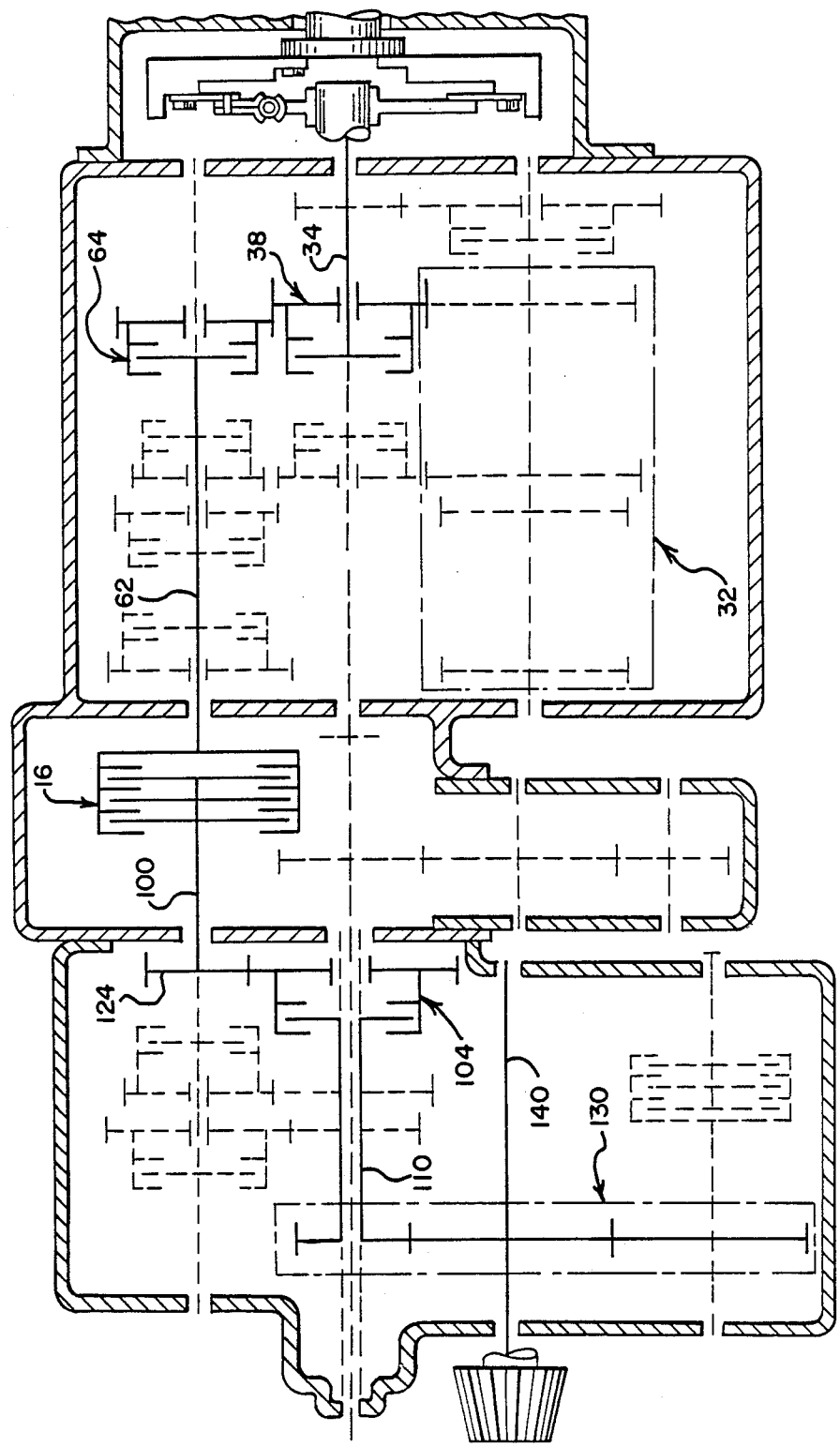

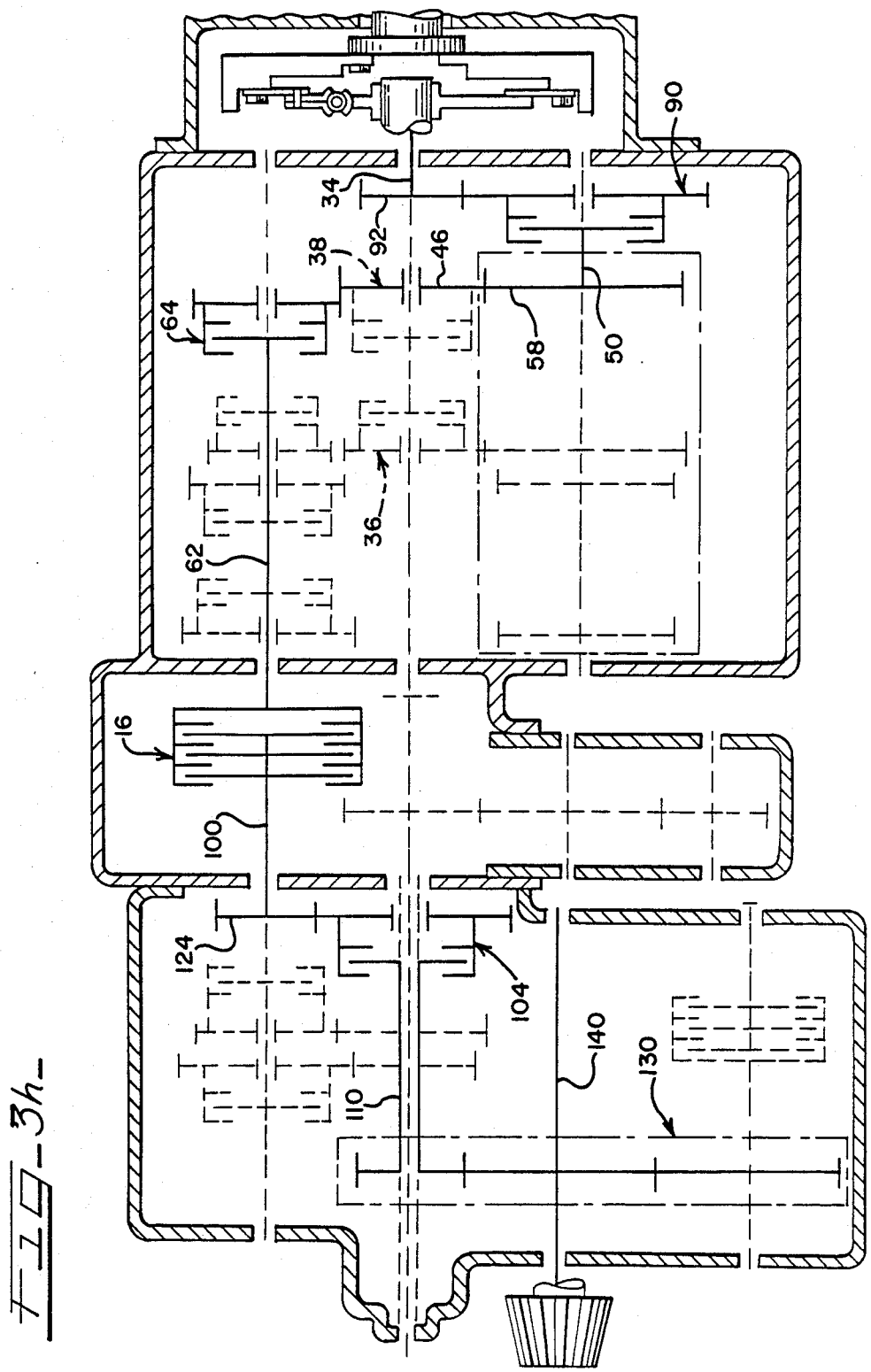

MULTI-SPEED POWERSHIFT TRANSMISSION

FIELD OF THE INVENTION

This invention relates to a multi-speed transmission for a tractor and the like and, more particularly, to a transmission having a speed transmission unit and a range transmission unit connected through a master clutch.

BACKGROUND OF THE INVENTION

The prior art is replete with various transmissions for agricultural tractors and the like. Multi-speed transmissions having countershafts are widely used in the power train of a tractor arrangement because a plurality of rotating clutch assemblies and associated gears can be positioned on parallel shafts to allow considerable flexibility in adapting them to different space requirements. Moreover, a substantial number of simple and/or similarly sized parts can be used for manufacturing economy.

Known transmissions offer multi-ratio gear arrangements capable of providing varios ground speeds in a working (3-8 m.p.h.) range. These transmissions are adequate for some operations. For many operations, however, the speeds are too widely spaced or stepped apart to permit the tractor to be operated at or near a maximum speed for a given load imposed thereon. Also, the operator, for some conditions, must frequently stop the vehicle to change the driving relationship between the input shaft and output shaft of the transmission.

Accordingly, what is needed in the art is a simple, yet rugged and compact, transmission capable of producing progressively increasing tractor speeds in multiple, equal step gear ratios ranging between about 1.75 miles per hour and about 19 miles per hour. To reduce operator fatigue, such a transmission should be capable of effecting a powershift between successive gear ratios. Such powershifts must be smooth yet responsive and impart relatively low inertias to various powershift clutches disposed throughout the transmission. Furthermore, the transmission must be able to pick-up a heavy load without damage to the powershift clutches.

SUMMARY OF THE INVENTION

In accordance with the above, the present invention provides a multi-speed powershift transmission for connection to a driven power shaft of a tractor or the like. In accordance with one aspect of the invention, the transmission comprises a speed transmission assembly, a range transmission assembly, and a master clutch selectively connecting the speed and range transmission assemblies.

The speed transmission assembly includes a speed input section which is connectable to the driven power shaft. The speed input section is capable of providing at least two different forward input speed ratios having a relatively small step or speed ratio differential therebetween. The speed input section comprises a pair of clutch operated drive gears mounted on a speed input shaft. These clutch operated drive gears are hydraulically actuated in an alternative manner.

The speed transmission assembly further includes a speed output section which is connected to the master clutch. The speed output section is capable of producing at least three equally different forward output speed ratios and one reverse output speed ratio. The speed output section comprises a plurality of driven gears which are mounted for rotation on a speed output shaft. Each driven gear is selectively connected to the speed output shaft by a hydraulically operated clutch. Moreover, any of the plurality of driven gears included in the speed output section are engaged by powershifting through the pair of clutch operated drive gears with the master clutch being continuously engaged.

A cluster gear assembly interconnects the speed input section and the speed output section. The cluster gear assembly is driven by either of the clutch operated drive gears. In one form of the invention, the cluster gear assembly includes a rotatable countershaft having a plurality of gears arranged thereon and which are rotatable therewith.

The range transmission assembly includes a range input shaft which is connected to the master clutch, a range or transmission output shaft, and a plurality of hydraulic clutch actuated gear assemblies. The hydraulic clutch actuated gear assemblies are interposed between the transmission input shaft and the range output shaft for providing at least three equally different speed ranges.

The master clutch allows the transmission to be powershifted between gear ratios whereby allowing the operator to shift "on-the-go". The master clutch has the necessary heat capacity to slip under load thereby protecting smaller powershift clutches disposed throughout the speed and range transmission assemblies.

In accordance with a further aspect of the invention, there is provided a powershift transmission for a tractor and the like comprising a speed transmission assembly, a range transmission assembly, and a hydraulically actuated master clutch selectively connecting the speed and range transmission assemblies.

The speed transmission assembly includes a speed input section for providing at least two different forward input speed ratios having a relatively small step or differential therebetween. More particularly, the speed input section comprises a speed input shaft which is rotatably supported by a housing and extends through the speed transmission assembly for connection to an engine driven input shaft.

A pair of hydraulically operated drive clutch assemblies are mounted on the speed input shaft. Each drive clutch assembly includes a drive gear which is in constant mesh with a cluster gear assembly. The cluster gear assembly is likewise rotatably supported by the housing. The drive clutch assemblies are alternatively operated to transmit power from the input shaft to the cluster gear assembly.

The speed transmission assembly also includes a speed output section capable of producing three equally different forward output speed ratios and one reverse output speed ratio. The speed output section of the speed transmission assembly comprises a speed output shaft disposed parallel to the speed input shaft and supported for rotation by the same housing. The speed output shaft is connected to the master clutch and has a series of speed output gears arranged thereon. These speed output gears constantly mesh with the cluster gear assembly. Each of the speed output gears includes a hydraulically operated clutch. The speed output gear clutches are operated alternatively to transmit power from the cluster gear assembly to the speed output shaft.

The range transmission assembly includes a housing which is tandemly arranged relative to the housing for the speed transmission assembly. The range transmission assembly also includes a range input shaft which is rotatably supported in the range transmission housing and is connected to the master clutch. A transmission output shaft is also rotatably supported by the housing and extends parallel to the input shaft. A plurality of range clutch assemblies are interposed between the range input shaft and the transmission output shaft. The range transmission assembly is capable of providing at least three equally different speed ranges depending on which range clutch assembly is engaged.

In a preferred form of the invention, the powershift transmission further includes a power take-off shaft which extends through the range transmission assembly and is supported by the housing thereof. The power take-off shaft is connected to and is axially aligned with the speed input shaft. In this preferred form of the invention, the range transmission assembly further includes a range countershaft. The range countershaft is coaxially arranged about the power take-off shaft and is rotatably supported by the housing of the range transmission assembly.

The speed output section of the speed transmission assembly includes a reverse gear as one of the series of speed output gears. This reverse gear is driven by either of the drive clutch assemblies to provide a reverse speed ratio.

The cluster gear assembly, which transmits motion and torque between the speed input and output sections of the speed transmission assembly, preferably includes a countershaft. The countershaft is rotatably supported by the speed transmission assembly housing and has a plurality of gears arranged thereon.

The speed transmission may further include a creeper gear arrangement. The creeper gear arrangement includes a creeper gear which is selectively connected to the countershaft through a hydraulically operated clutch. The creeper gear is in constant mesh with an input gear which rotates with the speed input shaft. In effect, the creeper gear arrangement provides a third forward input speed ratio having a relatively large speed ratio differential from the other two forward input speed ratios.

The range transmission assembly of the powershift transmission further includes a constant mesh output gear set. This output gear set includes a drive gear, a driven output gear, and a pinion gear. The drive gear is mounted on and is rotatable with the range countershaft. The driven output gear is preferably mounted on and rotatable with the transmission output shaft. The pinion gear is preferably carried by a pinion shaft which is rotatably supported by the range transmission assembly.

Preferably, a second transmission output shaft is provided which extends generally parallel to the first transmission output shaft. This second transmission output shaft is axially aligned with the pinion shaft and is selectively coupled thereto through a spring engaged clutch assembly.

In a multi-speed powershift transmission having a creeper gear arrangement, the speed transmission assembly is capable of developing at least nine different output speed ratios for any given input speed from the driven power shaft. Because any of those nine different output speeds can be further modulated by any of the three equally different speed ranges of the range transmission assembly, a total of at least twenty-seven forward speeds and nine reverse speeds can be produced by the transmission of the present invention. Of the twenty-seven forward speeds, six forward speeds are preferably below 2.5 m.p.h.

Other features and advantages of the present invention will become readily apparent in the following detailed description, the appended claims, and the accompanying drawings.

BRIEF DESCRIPTION OF THE DRAWINGS

FIG. 2 is a table which shows the relationship among the various gear ratios and the clutch assemblies which are engageable to achieve those gear ratios; and FIGS. 3a through 3h schematically illustrate various paths of power flow through the transmission which are accomplished by selectively operating different combinations of clutches between various shafts and gear sets, with the paths of power flow through torque transmitting parts being indicated in solid lines.

DETAILED DESCRIPTION OF THE PRESENT INVENTION

Figure 1:
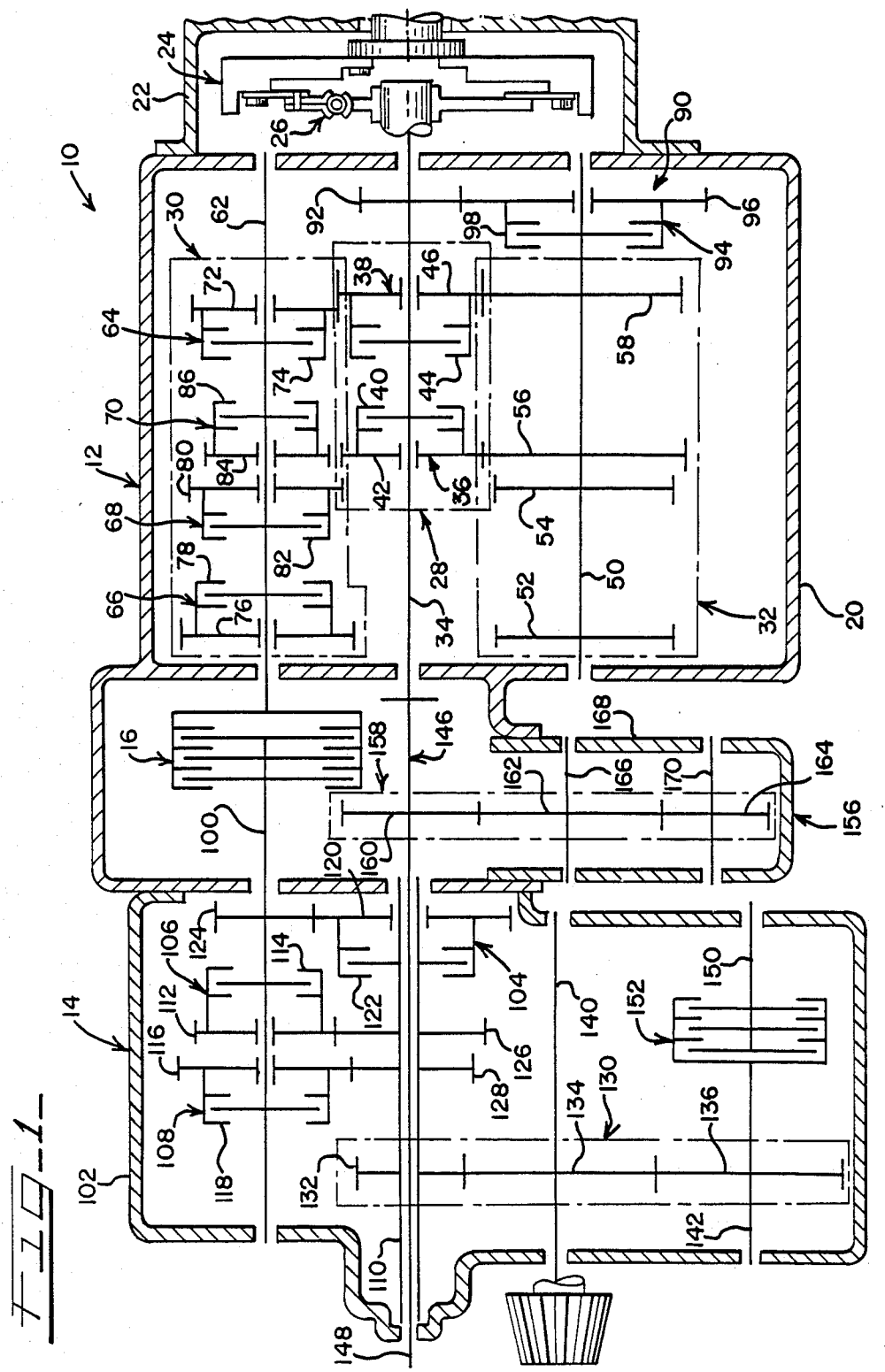
FIG. 1 is a diagrammatic, developed, but substantially side elevational view of a multi-speed powershift transmission constructed in accordance with the present invention.

While the present invention is susceptible of embodiment in various forms, there is shown in the drawings, and will hereinafter be described, a preferred embodiment of the invention with the understanding that the present disclosure is to be considered as an exemplification of the invention and is not intended to limit the invention to the specific embodiment illustrated.

Referring now to FIG. 1 there is shown a multi-speed powershift transmission 10. This transmission can be utilized in combination with an agricultural or industrial tractor and the like. The transmission 10 includes a speed transmission assembly 12 and a range transmission assembly 14. The speed transmission assembly 12 and range transmission assembly 14 are disposed in a tandem arrangement with a master clutch 16 disposed therebetween for selectively connecting these transmission assemblies.

The speed transmission assembly 12 is connected to an engine compartment of the tractor. A housing 20 of the speed transmission assembly is connected to a housing 22 of the engine compartment. A driven power shaft having an engine flywheel 24 arranged thereon transfers torque from an engine through a torque dampener mechanism 26 to the speed transmission 12.

The speed transmission assembly 12 includes a speed input section 28, a speed output section 30, and a cluster gear assembly 32. Cluster gear assembly 32 interconnects the input and output sections 28 and 30, respectively. The speed input section 28 is connectable to the engine flywheel 24 and provides at least two different or stepped forward input speed ratios having a relatively small step or speed ratio differential therebetween. The speed output section 30 is connected to the master clutch 16 and is capable of providing at least three equally different or stepped forward output speed ratios and one output reverse gear ratio. As such, the speed input section 28 and the speed output section 30 can be selectively combined to provide any one of at least six (2×3) different forward speed ratios and at least two reverse speed ratios for any given input speed from the engine flywheel 24.

More specifically, the speed input section includes an input shaft 34 which is rotatably supported by housing 20. The rotatable input shaft 34 extends through the speed transmission assembly. The speed input section 28 further includes a pair of clutch operated drive gear assemblies 36 and 38 arranged in juxtaposed relation on the input shaft 34.

Preferably, drive gear assembly 36 defines an odd-speed drive gear assembly and drive gear assembly 38 defines an even-speed drive gear assembly. The odd-speed drive gear assembly 36 includes a hydraulically operated clutch assembly 40 which is adapted to frictionally engage an odd drive gear 42 and selectively connect gear 42 to input shaft 34. The even-speed drive gear assembly 38 includes a clutch assembly 44 which is adapted to frictionally engage an even drive gear 46 and selectively connect gear 46 to input shaft 34. Hydraulic fluid inputs to the clutch assemblies 40, 44 are effected through a suitable distribution channel (not shown) which axially extends through the input shaft 34 and communicates with a hydraulic system of the tractor in a manner well known in the art.

With the exception of master clutch 16, the various clutches disposed throughout the transmission and herein discussed are designed as powershift clutches. Such clutches preferably include some or all of the teachings disclosed in my copending patent application, Ser. No. 184813, filed Apr. 22, 1988, the full teachings of which are incorporated herein by reference.

The cluster gear assembly 32 includes a countershaft 50 which is rotatably supported by the housing 20 of the speed transmission assembly 12. The cluster gear assembly 32 further includes a series of gears 52, 54, 56 and 58 splined on the countershaft 50 for rotation therewith. Gear 58 defines an even-driven gear which is in constant mesh with the even-drive gear 46 and transmits rotary power from the input shaft 34 to the cluster gear assembly 32 upon actuation of the even-drive gear assembly 38. Gear 56 is axially spaced from even-driven gear 58 and defines an odd-driven gear. Odd-driven gear 56 constantly meshes with the odd-drive gear 42 and transmits rotary power from the input shaft 34 to the cluster gear assembly 32 upon actuation of the odd-drive gear assembly 36. Drive gears 52 and 54 are arranged in juxtaposed relation relative to each other and are secured to the speed countershaft 50.

The speed output section 30 includes a speed output shaft 62 which is rotatably supported by the housing 20 of the speed transmission assembly. As illustrated, shaft 62 carries one reverse speed output drive gear assembly 64 and three forward speed output drive gear assemblies 66, 68 and 70.

The reverse gear assembly 64 includes a reverse gear 72 which is rotatably mounted on the speed output shaft 62 and a clutch assembly 74 which frictionally engages and selectively connects gear 72 to the speed output shaft 62. The reverse gear 72 is preferably in constant mesh with the even-drive gear 46 of the even-drive gear assembly 38.

Gear assembly 66 defines a ½ forward gear assembly which includes an output gear 76 rotatably mounted on the speed output shaft 62 and a clutch assembly 78. Clutch assembly 78 frictionally engages and selectively connects gear 76 to the speed output shaft 62. Gear 76 is in constant mesh with gear 52 of the cluster gear assembly 32.

Gear assembly 68 defines a ¾ forward gear assembly and includes an output gear 80 which is rotatably mounted on the speed output shaft 62 and a clutch assembly 82. Clutch assembly 82 frictionally engages and selectively connects gear 80 to the speed output shaft 62. Gear 80 is in constant mesh with gear 54 of the cluster gear assembly 32.

Gear assembly 70 defines a 5/6 forward gear assembly and includes an output gear 84 which is rotatably mounted on the output shaft 62 and a clutch assembly 86. Clutch assembly 86 frictionally engages and selectively connects gear 84 to the speed output shaft 62.

In the preferred embodiment, each clutch 74, 78, 82 and 86 is a hydraulically actuated assembly. Hydraulic fluid inputs to each clutch assembly are effected through a hydraulic oil channel (not shown) communicating with a vehicle hydraulic system of the tractor and which axially extends through the speed output shaft 62.

As illustrated, the speed transmission assembly 12 further includes a creep drive assembly 90. The creep drive assembly 90 includes an input gear 92, and a clutch driven gear arrangement 94. Gear 92 is rotatable with the input shaft 34. The clutch driven gear arrangement 94 includes a driven gear 96 rotatably mounted on the speed countershaft 50 and a clutch assembly 98. The driven gear 96 is in constant mesh with gear 92. Clutch assembly 98 frictionally engages and selectively connects the driven gear 96 to the speed countershaft 50.

Preferably, clutch 98 is a hydraulically operated assembly. Hydraulic fluid inputs for the clutch assembly 98 are effected through a hydraulic oil channel (not shown) axially extending through countershaft 50 and communicating with a hydraulic system for the tractor.

The speed output shaft 62 of the speed transmission assembly 12 is connected to the master clutch 16 thereby transmitting speed output shaft torque thereto. Preferably, master clutch 16 is a conventional, multiple disk, wet clutch including a hydraulically actuated piston which acts against a series of alternatively interleaved friction disks. The master clutch has the necessary heat capacity to slip under load thereby providing for modulated transmission engagement and also protecting the smaller powershift clutches disposed throughout the speed transmission assembly 12 and range transmission assembly 14.

The range transmission assembly 14 includes a range input shaft 100 rotatably supported in a range transmission housing 102. Shaft 100 is connected to the master clutch 16 and is preferably axially aligned with speed output shaft 62 of the speed transmission assembly 12. Range transmission assembly 14 also includes low, mid, and high range clutch assemblies 104, 106 and 108, respectively. The mid and high range clutch assemblies 106 and 108, respectively are carried by the shaft 100. Low range clutch assembly 104 is carried on a range countershaft 110 rotatably supported by housing 102. The low, mid, and high range clutch assemblies provide at least three equally different speed ranges.

The mid range clutch assembly 106 includes a drive gear 112 rotatably mounted about the input shaft 100 and a hydraulically operated clutch assembly 114. The hydraulically operated clutch assembly 114 frictionally engages and selectively connects drive gear 112 to the range input shaft 100.

The high range clutch assembly 108 includes a drive gear 116 rotatably mounted on the range input shaft 100 and a hydraulically operated clutch assembly 118. The clutch assembly 118 frictionally engages and selectively connect the drive gear 116 to the range input shaft 100.

Similarly, the low range clutch assembly 104 includes a gear 120 and a hydraulically operated clutch assembly 122 and gear 120 is rotably carried on the range countershaft 110. The hydraulically operated clutch assembly 122 frictionally engages and selectively connects gear 120 to the range counter shaft 110.

The low, mid, and high range clutch assemblies 104, 106 and 108, respectively, are in constant mesh with gears 124, 126 and 128. Gear 124 is secured for rotation with the range input shaft 100. Gears 126 and 128 are mounted for rotation with the range countershaft 110.

The range transmission assembly 12 further includes a constant mesh output gear set 130. The constant mesh output gear set includes a drive gear 132, a driven output gear 134 and a pinion gear 136. Drive gear 132 is mounted on and is rotatable with the range countershaft 110. The driven output gear 134 is mounted on and rotatable with a transmission output shaft 140 which is rotatably supported by the range transmission housing 102. The pinion gear 136 is carried by a pinion shaft 142 which is likewise supported by the range transmission housing 102.

Pinion gear 136 defines a front wheel drive gear. A second transmission output shaft 150 is axially aligned with the pinion shaft 142. The second transmission output shaft 150 passes through the bottom center of the range transmission housing 102 and speed transmission housing 20 to direct power to a front axle (not shown) of the tractor. The second transmission output shaft 150 is driven from the pinion shaft 142 through a spring engaged clutch assembly 152. In its preferred form, the clutch assembly 152 is hydraulically operated to disengage the clutch. Hydraulic fluid inputs can be supplied to the clutch assembly 152 through a coaxial passage (not shown) provided in the pinion shaft 142.

The transmission 10 of the present invention is further provided with a power take-off drive 146. In its preferred form, the range countershaft 110 is a tubular, axially extended shaft. A power take-off and pump drive shaft 148 is telescopically arranged within and passes through but is not engaged with the tubular countershaft 110. The power take-off drive shaft 148 is connected to the speed input shaft 34. Since the speed input shaft 34 to the speed transmission assembly 12 is directly connected to the engine flywheel 24, shaft 148 facilitates power transmittal from the engine flywheel 24 to a power take-off reduction gearing (not shown) behind the transmission at engine speed.

A hydraulic pump drive assembly 156 is arranged in combination with the transmission 10. The hydraulic pump drive assembly 156 includes a constant gear mesh 158 including a drive gear 160, a pump gear 162, and a drive arbor gear 164. The drive gear 160 is carried by the power take-off shaft 148 and is adapted for rotation therewith. Drive gear 160 is in constant mesh with the pump countershaft gear 162. Gear 162 is carried by a pump countershaft 166. Pump countershaft 166 is supported for rotation by a pump housing 168 only portions of which are shown in the drawing. Countershaft gear 162 constantly meshes with the drive arbor gear 164. The drive arbor gear 164 is integral with a pump arbor 170. The pump arbor 170 is rotatably supported by the pump housing 168. By such construction, the constant gear mesh 158 drives the hydraulic pump whenever the engine is running.

As in evident from the foregoing, the speed transmission assembly 12 is capable of producing any of six different forward drive speed ratios and two different reverse speed ratios for any given input speed. To effect such ends, the drive gear assemblies 36 and 38 of the speed input section provide at least two different forward input speed ratios having a relatively small step or speed ratio differential therebetween. (In a current embodiment a speed ratio differential of about 1:1.147 is provided between the gear assemblies 36 and 38.) The gear assemblies 66, 68 and 70 of the speed output section provide three equally different forward output speed ratios. The ½ and ¾ forward gear assemblies 66 and 68, respectively, have a output speed ratio differential therebetween which approximately doubles ($1.147 \times 1.147 = 1.315$) the speed ratio differential between the drive gear assemblies 36 and 38. Similarly, the ¾ and 5/6 forward gear assemblies 68 and 70, respectively, have a speed ratio differential therebetween which approximately doubles ($1.147 \times 1.147 = 1.315$) the speed ratio differential between the drive gear assemblies 36 and 38.

To effect a power shift of the speed transmission assembly 12 between first and second forward gear ratios (gear assembly 66 is engaged), third and fourth (gear assembly 68 is engaged), and fifth and sixth forward gear ratios (gear assembly 70 is engaged) alternative engagement of the odd and even drive assemblies 36 and 38, respectively, is effected. The speed power-shifting is made while the tractor is "on-the-go" and the master clutch 16 is engaged. Shifting between first and second, third and fourth, or fifth and sixth forward gear ratios is carried out by selective engagement of the clutch assemblies 78, 82 and 86, respectively, and can be made without stopping the tractor.

In those transmission embodiments which include creep drive assembly 90, the speed transmission assembly 12 has the capability of producing nine different forward drive speed ratios and three different reverse speed selections. That is, the addition of the creep drive assembly 90 to the speed transmission assembly 12 adds one additional forward input speed ratio and one additional reverse speed ratio to that which is available with the transmission gear arrangement as described above. Unlike the relatively small step or speed ratio differential between the even and odd drive gear assemblies 36 and 38, respectively, there is a relatively large step or speed ratio differential (in a current embodiment a speed ratio differential of about 1:3.9 is used) between the even drive gear assembly 36 and the creep drive assembly 90. As will be understood, actuation of the clutch assembly 98 of the creep drive assembly 90 directs power to the speed output section 30 in a manner bypassing the speed input section 28.

Any of the six or nine different forward drive speed ratios and two or three different reverse speed selections are further modulated by the range transmission assembly 14 depending upon which range clutch assembly is engaged. The range clutch assemblies 104, 106 and 108 provide three equally different (in a current embodiment $1.32 \times 1.32 \times 1.32 = 2.27$) steps or speed ratios between Low to Medium and Medium to High ranges.

FIG. 2 shows a table listing the various clutch assemblies which are engaged to obtain different speeds from the multi-speed powershift transmission 10 of the present invention. It should be noted, however, with the gear arrangements currently embodied, the high range clutch assembly 108 is preferably not used in combination with the creeper clutch assembly 90. With the gear arrangements currently embodied the high range clutch assembly 108 and creeper clutch assembly 90, when used in combination, render a gear ratio output which is not significantly different from that offered by other gear arrangements. Therefore, there is no particular benefit which would result from the proposed combination. On the other hand, and given slightly different gear arrangements within the transmission, it may be beneficial to use the creeper clutch assembly 90 in combination with the high range clutch assembly 108 to develop different gear ratio outputs for any given input.

The operation of the transmission 10 is as follows. With the operator controlled transmission shift lever in a neutral position, the clutch assembly 78 of the ½ forward gear assembly 66 is actuated in preparation for a shift into the forward speed range. No power is transmitted through the transmission in this position, however, as the input shaft 34 has no power link to the speed output shaft 62 because the odd/even drive gear assemblies 36, 38, respectively, are disengaged.

As the operator selects first speed, the odd drive gear assembly 36, the one ½ forward gear assembly 66, and the low range clutch assembly 104 are simultaneously engaged as the transmission shift lever is moved to effect engagement of the first speed.

Figure 3A:
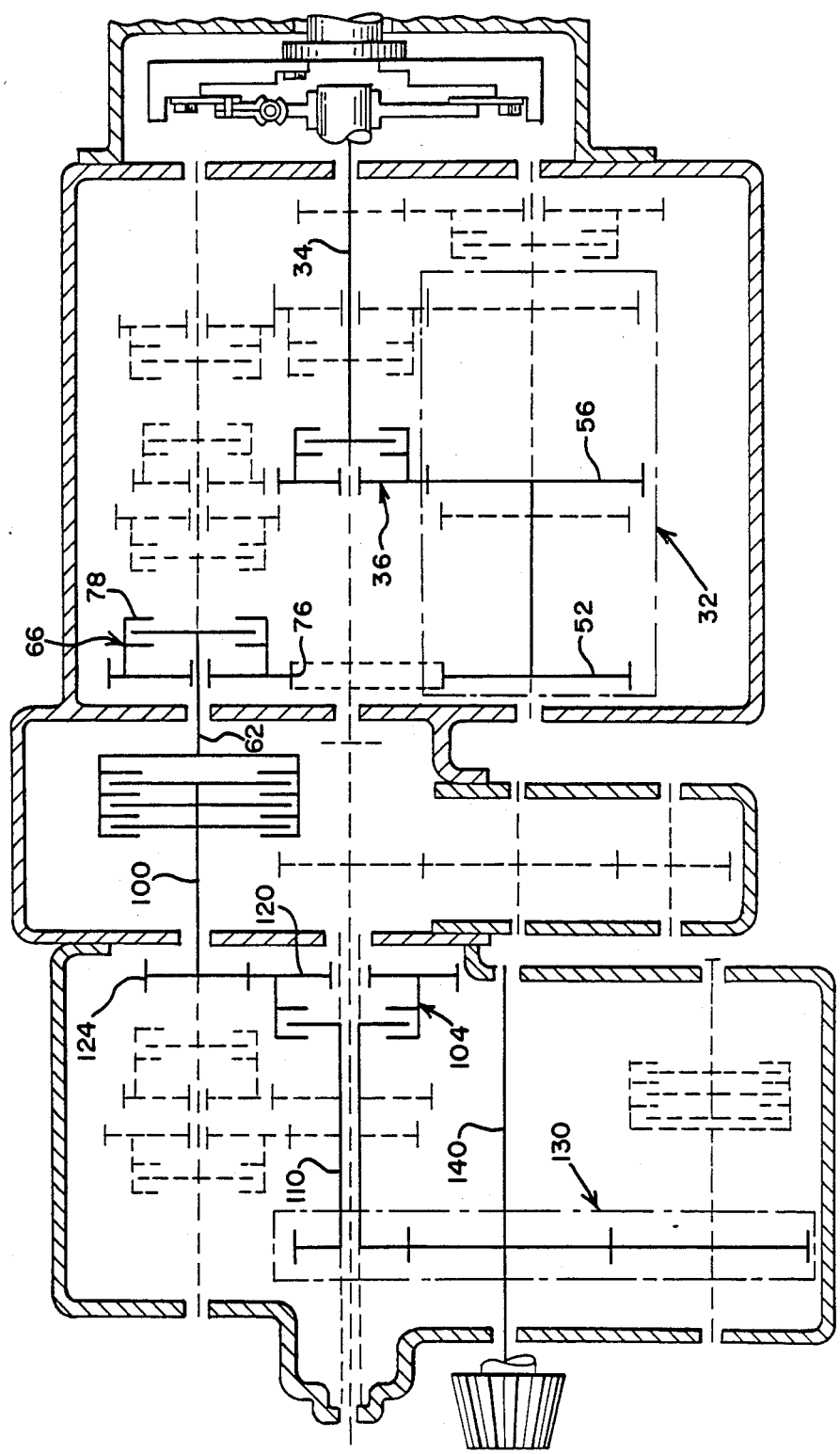

As schematically illustrated in FIG. 3a, in a first speed forward condition, power flows from the dampener 26 across the input shaft 34 and through the now engaged odd speed drive gear assembly 36 to the countershaft gear 56 causing rotation of the cluster gear assembly 32. Since gear 52 is in constant mesh with the output gear 76 of the ½ forward gear assembly, power flows from the cluster gear assembly 32 to the now engaged ½ forward gear assembly 66 and along the speed output shaft 62 to the master clutch 16.

With master clutch 16 engaged, power is transmitted across the range input shaft 100 to gear 120 of the low range clutch assembly 104 through gear 124. As a result of the low range clutch assembly 104 being engaged, power flows across the range countershaft 110 to the constant gear mesh 130. Power flow is delivered to the transmission output shaft 140 by the constant mesh gear set 130 in all speeds.

As will be understood, as the operator selects a second forward speed with the speed transmission shift lever, the even speed drive gear 38 assembly is alternatively actuated. When the even speed drive gear assembly 38 is engaged, power is transmitted from input shaft 34, through gear 46 and to the cluster gear assembly 32. Thereafter, the transfer of power to the speed output section 30 and subsequently to the transmission output shaft 140 is as described in the first speed arrangement. The power shifting between odd and even drive gear assemblies does not require disengagement of master clutch 16.

As the operator selects third speed, the even speed drive gear assembly 38 is disengaged and the odd drive gear assembly 36 is engaged. At the same time, the ½ forward gear assembly 66 is disengaged and the ¾ forward gear assembly 68 is engaged. In third speed, the low range clutch 104 assembly remains engaged.

FIG. 3b of the drawing schematically illustrates the power flow through the transmission in a third forward speed condition. In the third forward speed, power flows from the speed input shaft 34 through the odd speed drive gear assembly 36 to the ¾ forward gear assembly 68 and across the speed output shaft 62 to the master clutch 16. From master clutch 16, power flow through the range transmission 14 is the same as was described above and is the same for speeds one through six.

Clutch engagements for the fourth through sixth forward speeds are depicted in FIG. 2. The corresponding relationship between the input shaft 34 and the transmission output shaft 140 should be apparent in view of the above explanation for speeds one through three. Therefore, for brevity, and not by way of a limitation, a detailed explanation of these gear speeds will be omitted.

The transmission may be shifted from its sixth speed forward condition to a seventh speed forward condition by shifting the transmission shift lever. As the operator selects seventh speed, the even speed drive gear assembly 38 is disengaged and odd speed drive gear assembly 36 is engaged. At the same time, the 5/6 forward gear assembly 70 and the low range clutch assembly 104 are disengaged and the ½ forward gear assembly 66 and the mid range clutch assembly 106 are engaged.

As schematically illustrated in FIG. 3c, in a seventh speed forward condition, power flows from the input shaft 34 through the odd speed drive gear assembly 36 to the cluster gear assembly 32. Gear 52 of cluster gear assembly 32 is in constant mesh with and transfers power to the output drive gear 76 of the now engaged ½ forward gear assembly 66. Power flows from the ½ gear assembly 66 and across the speed output shaft 62 to the master clutch 16.

With master clutch 16 engaged, power is transmitted across the range input shaft 100 to the engaged mid range clutch assembly 106. Power then flows to the range countershaft driven gear 126, across the countershaft 110 to the constant mesh gear set 130. Power flow is delivered to the transmission output shaft 140 by the constant mesh gear set 130 in all speeds.

The clutch engagements for the seventh through twelfth forward speeds are depicted in FIG. 2. The corresponding relationship between the input shaft 34 and the output shaft 140 should be apparent in view of the above explanation for the seventh speed. Therefore, for brevity, and not by way of a limitation, a detailed explanation for each of these gear speeds will be omitted.

The transmission may be shifted from its twelfth forward gear condition to its thirteenth forward gear condition by shifting the transmission shift lever. As the operator selects a thirteenth speed, the even speed drive gear assembly 38 is disengaged and the odd speed drive gear assembly 36 is engaged. At the same time, the 5/6 forward gear assembly 70 and the mid range clutch assembly 106 which were engaged to effect a twelfth forward speed are disengaged, and the ½ forward gear assembly 66 and the high range clutch assembly 108 are engaged.

Figure 3D:
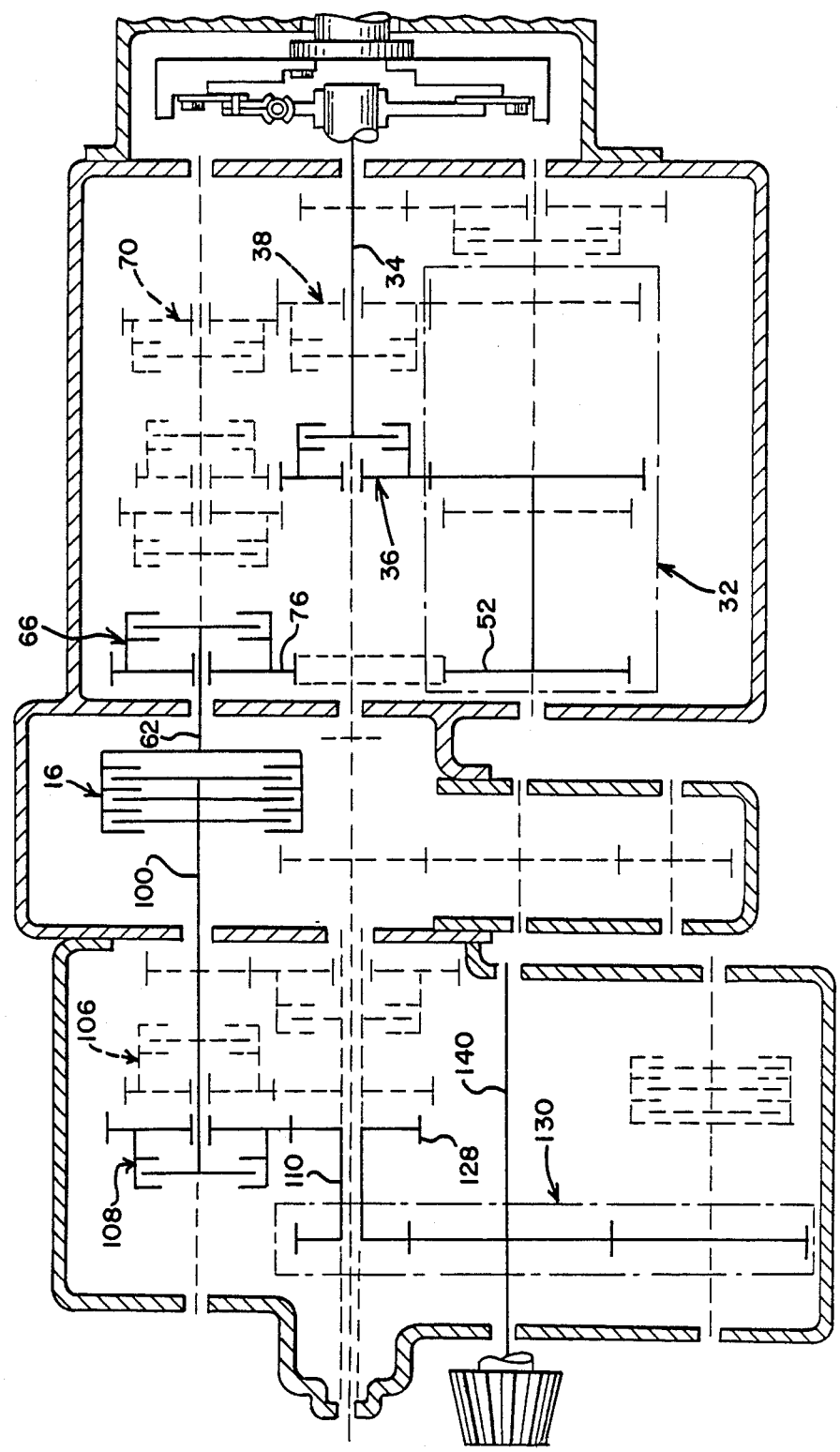

As schematically illustrated in FIG. 3d, power in a thirteenth forward speed condition flows from the speed transmission input shaft 34, through the odd speed drive gear assembly 36, to the cluster gear assembly 32. Gear 52 of the cluster gear assembly 32 is in constant mesh with and transfers power to the output drive gear 76 of the now engaged ½ forward gear assembly 66. Power flows from the ½ forward gear assembly 66 and across the output shaft 62 to the master clutch 16.

With master clutch 16 engaged, power is transmitted across the range input shaft 100 to the now engaged high range clutch assembly 108. Power then flows to the range countershaft driven gear 128, across the countershaft 110, to the constant mesh gear set 130. Power flow is delivered to the transmission output shaft 140 by the constant mesh gear 130 set in all speeds.

The clutch engagements for the fourteenth through eighteenth forward gears are depicted in FIG. 2. The corresponding relationship between the driven input shaft 34 and the transmission output shaft 140 should be apparent in view of the above explanation. Therefore, for brevity, and not by way of a limitation, a detailed explanation for each of these gear speeds will be omitted.

The power shift clutches arranged throughout the transmission may be synchronized relative to each other to assure quality shifts between gear ratios. An actuating mechanism for a transmission control system, disclosed in by co-pending patent application Ser. No. 184812, filed Apr. 22, 1988, describes presently preferred means for actuating the clutches disposed throughout the transmission in a synchronous manner. The full teachings of this copending application are incorporated herein by reference. Preferably, there is a continuous power flow and smooth shifts through the transmission during each power shift cycle.

PTO (power take-off) power is transmitted through the power take-off shaft 148. The transmission input shaft 34 drives the PTO and pump drive shaft 148. As such, power is transmitted from the engine into a PTO reduction gear at engine speed.

In those transmissions so equipped, the operator is further permitted to shift the transmission into a creeper range. As will be appreciated, the speed ratios of the creeper range as well as the speed ratios of the other gear arrangements of this transmission are dictated by the number of gear sets and the various gear sizes disposed throughout the transmission. The specific gear sizes are selected to provide a desired speed in a particular gear ratio and range but can be changed to accommodate a particular need.

As the operator selects a first creep speed CR1, the odd speed drive gear assembly 36 and even speed drive gear assembly 38 are disengaged. Simultaneously therewith, movement of the transmission shift lever to a first creep speed position engages the clutch assembly 98 of the clutch driven gear arrangement 94, the ½ forward gear assembly 66 and the low range clutch assembly 104.

As schematically illustrated in FIG. 3e, in a first creep speed condition, power flows across the speed transmission input shaft 34 to the creep speed input drive gear 92, through the engaged clutch driven arrangement 94 and across countershaft 50, to gear 52. From gear 52 power flows to the now engaged ½ forward gear assembly 66. Power is then directed through the ½ forward gear assembly 66, to the speed output shaft 62, and across to the master clutch 16.

With master clutch 16 engaged, power is transmitted across the range transmission input shaft 100 to the low range clutch assembly 104 through the drive gear 124. Power then flows from the low range clutch assembly 104 across the range countershaft 110 to the constant mesh gear set 130. Power flow is then delivered to the transmission output shaft 140 by the constant mesh gear set 130 in all speeds.

As will be understood, the remaining five forward creep speeds are accomplished through alternative engagement of the ¾ and 5/6 forward gear assembly 68 and 70, respectively, and the mid range clutch assembly 106. The clutch engagements for these other creeper speeds are depicted in FIG. 2. The corresponding relationship between the driven input shaft 34 and the transmission output shaft 140 should be apparent in view of the explanation of creeper speed CR1. It should be noted, however, that the high range clutch assembly 108 is not used for creeper speeds.

Depending upon transmission design, a plurality of different reverse speed ratios can be imparted to the transmission output shaft 140 for any given input speed. If the operator selects a first reverse speed R1, the odd speed drive gear assembly 36, reverse output drive gear assembly 64, and low range clutch assembly 104 are simultaneously engaged. The even speed drive gear assembly 38 is disengaged.

Figure 3F:
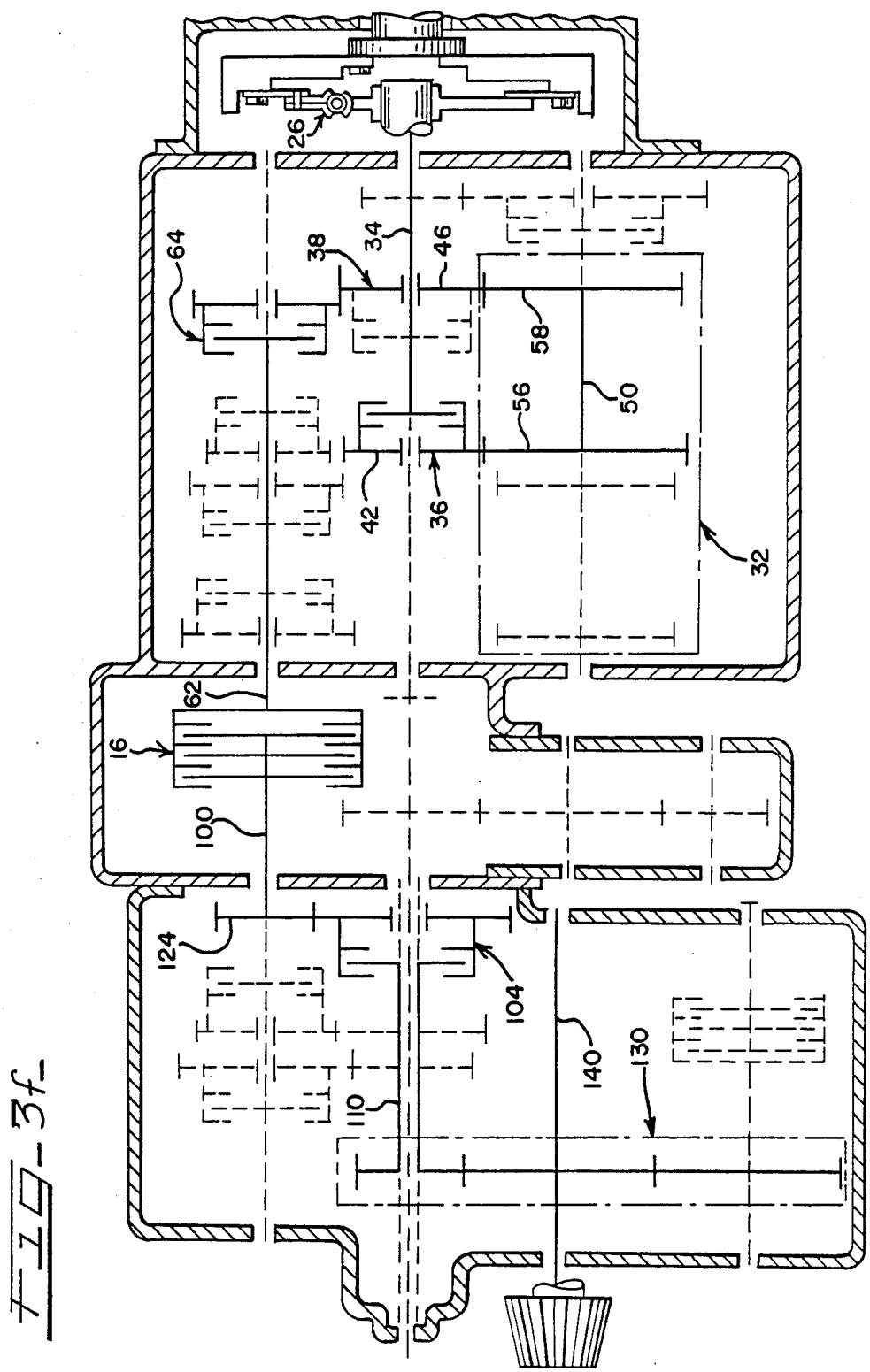

In a reverse speed R1 condition, as schematically illustrated in FIG. 3f, power flows from the dampener 26 across the input shaft 34 to the now engaged odd speed drive gear assembly 36. The engaged drive gear assembly 36 transmits power through odd drive gear 42 to gear 56 of the cluster gear assembly 32. Power flows from gear 56 across countershaft 50 to gear 58. Gear 58 drives even drive gear 46 which acts as a reverse idler gear. Power flows from gear 46 to the now engaged reverse output drive gear assembly 64.

Because of the gear arrangement just described, no separate reverse idler is necessary. Instead, the even drive gear 46 acts as a reverse idler gear. Power is then directed across the speed transmission output shaft 62 to the master clutch 16. With even drive gear 46 acting as a reverse idler gear for the first and third reverse speeds R1 and R3, respectively, the speed assembly output shaft 62 and everything rearward thereof, extending to the transmission output 140, is caused to reverse rotation compared to the forward gear rotation.

With master clutch 16 engaged, power is transmitted across the range input shaft 100 to the low range drive gear 124. From the low range drive gear 124 power is transmitted to the low range clutch assembly 104, across the range countershaft 110 to the constant mesh gear set 130. Power flow is delivered to the transmission output shaft 140 by the constant mesh gear set 130 in all speeds.

If the operator selects a second reverse speed R2, the even speed drive gear assembly 38, reverse output drive gear assembly 64, and low range clutch assembly 104 are simultaneously engaged. The odd speed drive gear assembly 36 is disengaged.

As schematically illustrated in FIG. 3g, in a second reverse speed condition, power flows from the speed transmission input shaft 34, through the even speed drive gear assembly 38, directly to the reverse output drive gear assembly 64. Since the cluster gear assembly 32 is not used to transmit power in the second reverse R2 or the fourth reverse R4, the direction of rotation provided to the speed output shaft 62 is opposite that which occurs in the forward speeds. Power flows from the engaged reverse output drive gear assembly 64, across the speed output shaft 62, to the master clutch 16.

With master clutch 16 engaged, power is transmitted across the range transmission input shaft 100 to the low range drive gear 124. Power then flows to the low range clutch assembly 104 and across the range countershaft 110 to the constant mesh gear set 130 in a manner driving the transmission output shaft 140.

As will be understood, the transfer of power through the speed transmission assembly 12 in third and fourth reverse speeds R3 and R4 is as described regarding first and second reverse speeds R1 and R2. To effect third and fourth reverse speeds, however, the low range clutch assembly 104 is disengaged and the mid range clutch assembly 106 is engaged. Thereafter, the transfer of power is as described above.

When the operator selects a first reverse speed in the creeper range CR1, the odd speed drive gear assembly 36 and the even speed drive gear assembly 38 are both disengaged. Simultaneously, the creep drive assembly 90, the reverse output drive gear assembly 64 and the low range clutch assembly 104 are engaged.

As schematically illustrated in FIG. 3h, in a reverse creeper range condition CR1, power flows across the speed input shaft to the creeper drive gear input 92. From input gear 92, power flows to the now engaged creep drive assembly 90 to the countershaft 50. Drive gear 58 on countershaft 50 transmits power through the freely rotatable gear 46 of the even speed drive gear assembly 38. Gear 46 acts as a reverse idler gear. From gear 46 power flows to the engaged reverse output drive gear assembly 64 and to the speed transmission output shaft 62. The above described transfer of power causes the speed output shaft 62 and everything rearward extending to the transmission output shaft 140 to reverse rotation compared to the forward gear rotation.

Power is transmitted across the output shaft 62, and the engaged master clutch 16, to the range input shaft 100. From the range input shaft 100, power is transmitted through the drive gear 124, the low range clutch assembly 104 and to the countershaft 110. The power from countershaft 110 is transferred to the constant gear mesh set 130 and is transferred to the transmission output shaft 140.

As will be appreciated, the versatility of the present invention allows a total of nine different reverse speeds to be produced by the clutch and gear combination described above. The clutch engagement for the third and fourth reverse speed ratios R3, R4 and second reverse speed in the creeper range CR2 are depicted in FIG. 2. The corresponding relationship between the input shaft and the transmission output shaft should be apparent in view of the above explanation. In addition to that illustrated in FIG. 2, three additional output reverse speeds could be produced if the high range clutch assembly 108 is used in combination with the speed transmission assembly 12.

Preferably, only the six reverse gear speeds illustrated in FIG. 2 are actually practiced or used with the present invention. The remaining three reverse speeds provide reverse gear speeds which are in excess of that desired or necessarily required for a tractor. The versatility of the present invention, however, should be appreciated in that it is capable of developing at least nine different reverse speed outputs.

From the above, it will be appreciated that the engine transmits torque to the transmission input shaft 34. The input shaft 34 transmits torque to the cluster gear assembly 32 through one of three drive gear assemblies, whichever is engaged: the odd speed drive gear assembly 36, the even speed drive gear assembly 38, or the creep drive assembly 90. Thus, the gears 52, 54, 56, 58 of the cluster gear assembly rotate at three distinct input speed ratios with respect to the speed of the input shaft 34 depending on which of the three drive gear assemblies is engaged.

Three gears, 52, 54 and 56 of the cluster gear assembly are in constant mesh with the ½ forward gear assembly 66, the ¾ forward gear assembly 68, and the 5/6 forward gear assembly 70, respectively. Thus, the speed output shaft 62 rotates at three distinct speed ratios with respect to the rotating speed of the cluster gear assembly 32 depending upon which of the three forward gear assemblies are engaged. Therefore, the speed output shaft 62 can be caused to rotate at nine ($3 \times 3$) distinct speed ratios with respect to the speed of the input shaft 34 depending on which of the drive gear assemblies 36, 38 and 90 and which of the forward gear assemblies 66, 68 and 70 are engaged.

The drive gear 46 of the even drive gear assembly 38 is in constant mesh with the reverse gear 72 of the reverse output drive gear assembly 64. When the reverse output drive gear assembly 64 is engaged, the reverse gear 72 is operably connected to the speed transmission output shaft 62. As such, the even drive gear assembly 38 drives the output shaft in reverse when any one of the three drive gear assemblies 36, 38, or 90 are engaged. As mentioned earlier, drive gear 46 acts as a reverse idler gear when the odd drive gear assembly 36 and the creep drive assembly 90 are engaged. Drive gear 46 directly drives the reverse output drive gear assembly 64 when the even drive gear assembly 38 is engaged. Thus, the speed output shaft 62 can be caused to rotate at three different reverse speed ratios with respect to the rotating speed of the input shaft 34 depending upon which drive gear asembly 36, 38 or 90 is engaged.

The range transmission assembly 14 preferably comprises range input shaft 100, countershaft 110, transmission output shaft 140, and low, mid, and high range clutch assemblies 104, 106, 108, respectively. The output shaft 62 of the speed transmission assembly 12 is selectively coupled to the input shaft 100 of the range transmission assembly 14 through the master clutch 16. The heat compacity of the master clutch is large enough to absorb the energy generated during large speed changes in the transmission during operator controlled slipping of the clutch.

The output torque of the master clutch 16 is transmitted across the range input shaft 100 to any one of the three range clutch assemblies 104, 106 or 108, whichever is engaged, and to the range countershaft 110. As such the various inputs to the master clutch 16 by the speed transmission assembly 12 are further modulated by the range transmission assembly 14. The versalitity of the present invention permits the countershaft 110 to rotate in any of three distinct speed ranges, with respect to the speed of input shaft 100, depending upon which range clutch assembly 104, 106 or 108 is engaged. As will be understood, the total number of output speeds capable of being developed by the combination of speed and range transmission assemblies 12 and 14, respectively, is twenty-seven ($3 \times 3 \times 3 = 27$) forward speeds and nine ($3 \times 1 \times 3 = 9$) reverse speeds.

It should be noted that the low range clutch assembly 104 is arranged on the range countershaft 110 rather than on the range input shaft 100. Such a design maintains the relative clutch speed to a minimum when the transmission is in the highest gear.

Clutch assembly 104 preferably includes some or all of the teachings disclosed in my co-pending patent application, Ser. No. 138,201 filed Dec. 28, 1987; the full teachings of which are incorporated herein by reference.

The individual speed ratios for the various gear arrangements can be selected such that the speed transmission input section 28 has a relatively small step or speed ratio differential between the odd speed drive gear assembly 36 and the even speed drive gear assembly 38. Preferably, a large step or speed ratio differential is established between the even speed drive gear assembly 38 and the creep drive assembly 90. The output section 30 of the speed transmission assembly is capable of producing three steps or speed differentials. Each step or speed differential of the output section 30 approximately doubles the speed differential between the odd and even speed drive speed assemblies. The range transmission assembly has speed ratio differentials between the low, mid and high range clutch assemblies, 104, 106 and 108 which are approximately equal.

The speed differentials or steps described above will provide a transmission of eighteen equally stepped forward speeds and six reverse speeds. If the creep drive assembly 90 is also considered, a transmission capable of developing twenty-seven forward speeds and nine reverse speeds is obtainable.

When the creep drive assembly 90 is used, twenty-four of the twenty-seven forward speeds and six of the nine reverse speeds are commonly used. The additional three speeds forward and three reverse speeds which could be obtained by combining the output speed ratio of the creeper drive gear assembly with the high range output clutch assembly 108 provide lower speeds than that provided by the first forward speed ratio and are not utilized in the preferred embodiment.

The location of the master clutch 16 between the speed transmission assembly 12 and range transmission assembly 14, as well as the location of the power shift clutches, facilitate reduction of energy, time and shifting force. The power shifting between the odd speed drive gear assembly 36 and even speed drive gear asembly does not require any clutching. That is, power shifting between the odd speed drive gear assembly 36 and even speed drive gear assembly 38 can be affected "on-the-go", i.e. without stopping the tractor.

From the foregoing, it will be observed that numerous modifications or variations can be effected without departing from the true spirit and scope of the novel concept of the present invention. It will be appreciated that the present disclosure is intended as an exempliciation of the invention, and is not intended to limit the invention to the specific embodiment illustrated. The disclosure is intended to cover by the appended claims all such modifications as fall within the scope of the claims.

What is claimed is:

1. A multi-speed powershift transmission for connection to a driven power shaft, said transmission comprising:
   a speed transmission assembly including a speed input section connectable to said power shaft for selectively producing either of at least two forward input speed ratios having a relatively small speed ratio differential therebetween; a speed output section for selectively producing any one of at least three equally different forward output speed ratios and at least one reverse speed ratio; said input section comprising a pair of clutch operated drive gears mounted on a speed input shaft and hydralically actuated in an alternative manner; said output section comprising a plurality of driven gears including a reverse gear mounted on a common speed output shaft, each driven gear having a hydraulically actuated clutch for connecting a selected driven gear to said speed output shaft; and a cluster gear assembly interconnecting said input and output sections, said cluster gear assembly being selectively driven by either of said clutch operated drive gears; and
   a range transmission assembly for selectively producing any one of a least three equally different forward speed ranges, said range transmission assembly including a range input shaft which is operably coupled to the speed output shaft of said speed transmission assembly, a transmission output shaft, and a plurality of hydraulic clutch actuated gears interposed between said range input shaft and said transmissions output shaft and
   a master clutch assembly selectively interconnecting said speed and range transmission assemblies.

2. The multi-speed transmissions of claim 1 wherein said cluster gear assembly includes a rotatable countershaft having a plurality of gears arranged thereon and rotatable therewith.

3. The multi-speed transmission of claim 1 wherein any of the plurality of driven gears included in said speed output section are engaged by powershifting through said pair of clutch operated drive gears with said master clutch assembly being continuously engaged.

4. A powershift transmission for a tractor and the like comprising:
   a speed transmission assembly;
   a range transmission assembly;
   a hydraulically actuated master clutch selectively connecting said speed and range transmission assemblies;
   said speed transmission assembly including a housing, a speed input section for providing at least two forward input speed ratios having a relatively small speed differential therebetween, wherein said speed input section comprises a speed input shaft rotatably supported by said housing and extending through said speed transmission assembly for connection to an engine driven input shaft, a pair of hydraulically operated drive clutch assemblies mounted on said speed input shaft, each of said drive clutch assemblies including a drive gear which is in constant mesh with a cluster gear assembly rotatably supported by said housing, said drive clutch assemblies being alternatively operated to transmit power form said speed input shaft to said cluster gear assembly; and a speed output section for providing three equally different forward output speed ratios and at least one reverse output speed ratio, wherein said speed output section comprises a speed output shaft disposed parallel to said speed input shaft and supported for rotation by said housing, said speed output shaft being connected to said master clutch and providing a common mount for a series of speed output gears including a reverse gear which constantly mesh with said cluster gear assembly, each of said speed output gears including a hydraulically operated clutch, said clutches for said speed output gears being alternatively operated to transmit power from said cluster gear assembly to said speed output shaft; and
   said range transmission assembly providing at least three equally different speed ranges, said range transmission assembly including a housing tandemly arranged relative to the housing for said speed transmission assembly, a range input shaft rotatably supported in said speed housing and connected to said master clutch, a transmission output shaft rotatably supported by said housing parallel to said input shaft, a plurality of clutch operated gear assemblies interposed between said input shaft and said transmission output shaft.

5. A powershift transmission according to claim 4 further including a power take-off shaft extending through said range transmission assembly and supported by the housing thereof, said power take-off shaft being connected to and axially aligned with said speed input shaft.

6. A powershift transmission according to claim 5 wherein said range transmission assembly further includes a range countershaft telescopically arranged about said power take-off shaft and rotatably supported by the housing of said range transmission assembly.

7. A powershift transmission according to claim 4 wherein the cluster gear assembly of said speed transmission assembly includes a countershaft rotatably supported by said speed transmission assembly housing and a plurality of gears arranged thereon.

8. A powershift transmission according to claim 7 wherein said speed transmission assembly further includes a creeper gear rotatably mounted on said countershaft and selectively connected thereto by a hydraulically operated clutch, said creeper gear being in constant mesh with a drive gear connected to said speed input shaft for providing a third forward input speed ratio having a relatively large speed ratio differential from the other two forward input speed ratios.

9. A powershift transmission according to claim 8 wherein said gears of said cluster gear assembly, the creeper gear, and said series of speed output gears are selectively connected to allow said speed transmission assembly to derive at least nine different output speed ratios for any given input speed from said driven power shaft.

10. A powershift transmission according to claim 7 wherein the speed input and speed output sections of said speed transmission assembly combine with said range transmission assembly to provide at least 18 different forward speeds and six reverse speed from any given input.

11. A multi-speed powershift transmission for connection to a driven power shaft, said transmission comprising:
a speed transmission assembly including a speed input section connectable to said power shaft and capable of producing at least two forward input speed ratios having a relatively small speed ratio differential therebetween; a speed output section capable of producing at least three equally different forward output speed ratios and at least one reverse speed ratio; said input section comprising a pair of clutch operated drive gears mounted on a speed input shaft and hydraulically actuated in an alternative manner; said output section comprising a plurality of driven gears mounted on a speed output shaft, each driven gear having a hydraulically actuated clutch for connecting a selected driven gear to said speed output shaft and wherein one of said driven gears mounted on said speed output shaft is a reverse gear, said reverse gear being in constant mesh with one of said pair of clutch operated drive gears mounted on said speed input shaft such that said one of said clutch operated drive gears acts as a reverse idler gear when said transmission is conditioned to provide a reverse gear ratio; and a cluster gear assembly interconnecting said input and output sections, said cluster gear assembly being driven by either of said clutch operated drive gears; and
a range transmission assembly capable of producing at least three equally different forward speed ranges, said range transmission assembly including a range input shaft which is operably coupled to the speed output shaft of said speed transmission assembly, a rotatable transmission output shaft, and a plurality of hydraulic clutch actuated gears interposed between said range input shaft and said transmission output shaft.

12. A powershift transmission according to claim 11 wherein said range transmission assembly further includes a constant mesh output gear set, said output gear set including a drive gear mounted on and rotatable with a range countershaft rotatably supported in said range transmission assembly housing, a driven output gear mounted on and rotatable with said transmission output shaft, and a pinion gear carried by a pinion shaft rotatably supported by said range transmission assembly.

13. A powershift transmission according to claim 12 wherein a second transmission output shaft extends generally parallel to said rotatable transmission output shaft, and is selectively coupled to said pinion shaft through a spring engaged clutch assembly.

14. A powershift transmission for a tractor and the like comprising:
a speed transmission assembly;
a range transmission assembly;
a hydraulically actuated master clutch selectively connecting said speed and range transmission assemblies;
said speed transmission assembly including a housing, a speed input section for providing at least two forward input speed ratios having a relatively small speed differential therebetween, wherein said speed input section comprises a speed input shaft rotatably supported by said housing and extending through said speed transmission assembly for connection to an engine driven input shaft, a pair of hydraulically operated drive clutch assemblies mounted on said speed input shaft, each of said drive clutch assemblies including a drive gear which is in constant mesh with a cluster gear assembly rotatably supported by said housing, said drive clutch assemblies being alternatively operated to transmit power from said input shaft to said cluster gear assembly; and a speed output section for providing three equally different forward output speed ratios and at least one reverse output speed ratio, wherein said speed output section comprises a speed output shaft disposed parallel to said speed input shaft and supported for rotation by said housing, said speed output shaft being connected to said master clutch and having a series of speed output gears constantly meshing with said cluster gear assembly and wherein one of said series of speed output gears is a reverse gear which is driven by either of said drive clutch assemblies, each of said speed output gears including a hydraulically operated clutch, said clutches for said speed output gears being alternatively operated to transmit power from said cluster gear assembly to said speed output shaft; and
said range transmission assembly providing at least three equally different speed ranges, said range transmission assembly including a housing tandemly arranged relative to the housing for said speed transmission assembly, a range input shaft rotatably supported in said housing and connected to said master clutch, a transmission output shaft rotatably supported by said housing parallel to said input shaft, a plurality of clutch operated gear assemblies interposed between said input shaft and said transmission output shaft.

* * * * *

UNITED STATES PATENT AND TRADEMARK OFFICE
CERTIFICATE OF CORRECTION

PATENT NO.  : 4,858,495

DATED       : August 22, 1989

INVENTOR(S) : Joachim Horsch

It is certified that error appears in the above-identified patent and that said Letters Patent is hereby corrected as shown below:

Column 1, line 23, "varios" should be -- various --.

Column 5, line 57, "½" should be -- 1/2 --;

line 64, "¾" should be -- 3/4 --.

Column 7, line 63, "in" should be -- is --.

Column 8, line 7, "½ and ¾" should be -- 1/2 and 3/4 --.

Column 9, lines 10, 18, 28, 30 and 55, "½" should be -- 1/2 --;

lines 56 and 63, "¾" should be -- 3/4 --.

Column 10, lines 16, 24 (two occurrences), 51, 60 and 61, "½" should be -- 1/2 --.

Column 11, lines 43, 51 and 52, "½" should be -- 1/2 --;

line 65, "¾" should be -- 3/4 --.

Column 13, line 65, "½" should be -- 1/2 --.

line 66, "¾" should be -- 3/4 --.

Column 16, line 11, "transmissions output shaft and" should be -- transmission output shaft; and --

UNITED STATES PATENT AND TRADEMARK OFFICE
CERTIFICATE OF CORRECTION

PATENT NO. : 4,858,495

DATED : August 22, 1989

INVENTOR(S) : Joachim Horsch

It is certified that error appears in the above-identified patent and that said Letters Patent is hereby corrected as shown below:

line 14, "transmissions" should be -- transmission --;

line 45, "form" should be -- from --;

line 67, delete "speed".

Signed and Sealed this

Twenty-fifth Day of December, 1990

Attest:

HARRY F. MANBECK, JR.

*Attesting Officer*      *Commissioner of Patents and Trademarks*